Patented Jan. 15, 1952

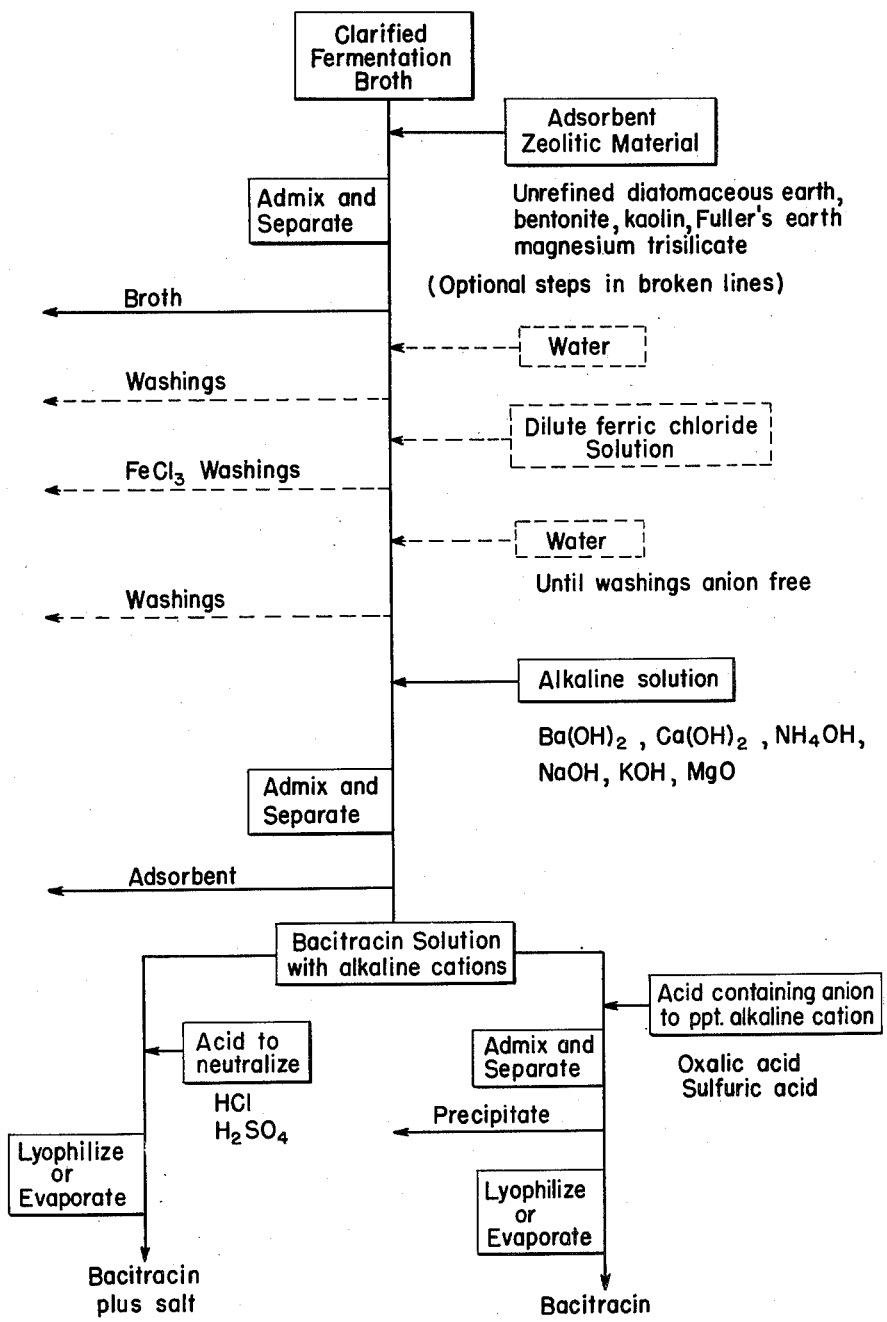

2,582,921

UNITED STATES PATENT OFFICE 2,582,921

PURIFICATION OF BACITRACIN BY ADSORPTION

Jesse Charney, Philadelphia, Pa., assignor to Sharp & Dohme, Incorporated, Philadelphia, Pa., a corporation of Maryland Application February 3, 1949, Serial No. 74,493

4 Claims. (Cl. 167—65)

This invention concerns itself broadly with the purification of the antibiotic bacitracin and more particularly with a method of purification of bacitracin involving the adsorption of bacitracin from an acidic solution on a zeolitic material, elution of the bacitracin with an alkaline solution and isolation of the purified bacitracin.

Heretofore bacitracin has been isolated from its fermentation broth by solvent extraction and recovery of the bacitracin from the solvent. This procedure requires use of a volume of solvent approximately equal to the volume of the fermentation broth and the solvent must be separated from the bacitracin as by evaporation. Starting with a fermentation broth containing approximately 20 u./ml. of bacitracin, the bacitracin produced by the solvent extraction method is of a purity of the order of twenty to thirty units per milligram and toxicity of approximately 10,000 units per kilogram in mice (LD 50). On the other hand, using a fermentation broth containing approximately 20 u./ml. of bacitracin it is possible by means of the present invention to obtain a bacitracin of a purity of 40 to 50 units per milligram and a toxicity of only 25,000 units per kilogram in mice (LD 50). Lower concentrations of bacitracin in the fermentation broth will give bacitracin of correspondingly lower potency.

A particular advantage of the process contemplated by this invention is that the final aqueous solution from which the purified bacitracin must be recovered is only about ⅕ the volume of the solution obtained by use of the solvent extraction method. Further, the present purification method eliminates the use of an organic solvent and the necessity for its removal and recovery, the process is not affected by temperature variation and the product obtained is more potent and less toxic.

In carrying out the complete process contemplated by this invention it is desirable first to free the original fermentation broth of the producing organism, some products of metabolism, and other impurities. The fermentation broth is made acid to a pH of approximately 4. Suitable acids are hydrochloric or sulfuric. The broth is then treated with a coagulating agent such as ferric or aluminum chloride until a pH of approximately 2.5 results and a coagulum is formed. The optimum amount of coagulant is best determined empirically on a small aliquot by noting the amount of coagulant necessary to produce coagulation with a resulting clear supernatant and scaling the results up to large batches. Good results are obtained if the final adjustment is in the pH range of 1.5-3.5. The adjustment of the pH of the original broth to approximately 4 with acid is not critical as good results can be obtained in the range of 4 to 8 with subsequent adjustment to a pH in the above stated range of 1.5 to 3.5 by treatment with a coagulating agent such as ferric or aluminum chloride. Initial use of the acid to lower the pH is more economical.

The coagulum consisting of the producing organism, some products of metabolism, carbohydrate gums and other impurities is separated from the fermentation broth. Suitable means of separation are filtration, centrifugation, and decantation, or the like.

The clarified fermentation broth is then admixed with a zeolitic material by either stirring the material in the broth or passing the broth through the material. Suitable zeolitic materials are those such as bentonite, kaolin, magnesium trisilicate, fuller's earth, diatomaceous earth (unrefined Johns-Manville Filter-Cel, Dicalite Superaid).

Unrefined diatomaceous earths exhibit zeolitic properties and are thus embraced in the term zeolitic material as used in this specification. It has been found to be particularly advantageous to precondition the adsorbent by washing successively with an alkaline solution such as sodium, calcium, or ammonium hydroxide, then with an acid (such as acetic, hydrochloric or sulfuric) and finally with water. The concentration of the solutions used are not critical but it has been found particularly effective to use dilute solutions. It is to be noted that refined grades of diatomaceous earth are not operable. Also calcining the diatomaceous earth renders it unsuitable for use in this invention. Certain zeolitic materials, for example, bentonite, have superior adsorbent properties but are extremely difficult to filter. This difficulty can be overcome by utilizing a mixture of the bentonite and a filter aid such as calcined diatomaceous earth. This mixture retains the excellent adsorptive properties of the bentonite and overcomes the difficulty of separation of the bentonite from the fermentation broth.

As to the amount of adsorbent required, two to 50 grams of zeolitic material per liter of broth has proved particularly satisfactory, depending on the broth which is processed and the particular zeolitic material used.

After admixing the broth and adsorbent, the fermentation broth is separated from the adsorbent and the broth discarded. Suitable means of separation are filtration, decantation, centrifugation and the like. The bacitracin, together with some impurities, is adsorbed from the fermentation broth and retained on the adsorbent. The adsorbed impurities are removed from the adsorbent by washing it successively with water, then with approximately 10% ferric chloride solution in about 1/100 the volume of the fermentation broth, and finally with water until the washings are iron free. It is to be appreciated that this washing step is not essential as purity of the adsorbed bacitracin has been increased already. However the washing step further eliminates impurities and adds to the purity of the final product.

The adsorbed bacitracin is eluted from the adsorbent by admixing the adsorbent and a volume of alkaline solution approximately one-fifth the volume of the original fermentation broth. The volume of alkaline solution used is not critical, but it is to be realized that the smaller volume used the less will be the volume which must be concentrated in order to separate the bacitracin from it. The eluate is then separated from the adsorbent. Alkalis such as ammonium, sodium, calcium and barium hydroxides and magnesium oxide are particularly useful. Calcium and barium hydroxide solutions are preferred as the cations can be removed from the solution easily by precipitation as the oxalate and sulfate respectively.

The eluate is neutralized with an acid such as hydrochloric, sulfuric, acetic, citric, oxalic and the like. It is to be realized that the choice of an acid is governed by the alkali used as the eluant and whether or not it is desired to finally obtain bacitracin free from any salts. Thus, if one has used barium hydroxide as an eluant, choice of sulfuric acid to neutralize the solution will result in precipitation of barium sulfate which can then be separated from the solution as by filtration or decantation leaving an aqueous solution of bacitracin from which the bacitracin can be recovered. It is to be noted that some bacitracin is adsorbed on the precipitated barium sulfate and that the yield is thus decreased. However, if calcium hydroxide has been used as the eluant, choice of oxalic acid for neutralization will result in precipitation of calcium oxalate which can be removed from the solution leaving an aqueous solution of bacitracin. The precipitated calcium oxalate adsorbs but little bacitracin and the yields are better than when barium sulfate has been precipitated.

On the other hand, if calcium hydroxide has been used as the eluant and hydrochloric acid is used for neutralization, calcium chloride will remain in solution with the bacitracin and will act as an inert contaminant of the final bacitracin.

It is to be realized that the solution of bacitracin can be utilized as a therapeutic agent or if desired bacitracin can be separated from the solution. If it is desired to isolate the bacitracin, the neutralized eluant is concentrated and lyophilized to recover the bacitracin.

It is to be noted that this process is operable over a wide temperature range i. e. from approximately 0 to 80° centigrade.

Starting with a fermentation broth containing approximately 20 u./ml. of bacitracin, the resulting bacitracin has a purity of approximately 50 units per milligram and a toxicity of only 25,000 units per kilogram in mice (LD 50) and represents a marked improvement over bacitracin heretofore obtainable in respect to both potency and lack of toxicity.

The bacitracin is recovered in approximately 75% yield from the fermentation broth.

The invention is illustrated by, but not restricted to, the following examples:

*Example 1.*—Twenty liters of a medium composed of 3% glucose, 0.5% of ammonium sulfate, 0.5% citric acid, and 0.3% calcium carbonate plus Speakman's mineral salts, was fermented with Tracy S. B. Strain of *Bacillus subtilis*. The fermentation was stopped with 22 units of bacitracin per milliliter present in the broth.

The pH of the broth was adjusted to 4.25 with 1:1 hydrochloric acid and then to a pH of 2.5 by addition of 10% ferric chloride solution. A coagulum was formed. The broth was then filtered through a Buchner funnel to separate it from the coagulum.

An adsorbent bed of infusorial earth (150 grams Johns-Manville Filter-Cel) on a Buchner funnel was preconditioned by washing in succession with dilute ammonia until the washings were colorless, then with approximately one liter distilled water, then with approximately one liter of 1% hydrochloric acid and finally with distilled water until the washings were anion free. Ten liters of the clarified fermentation broth containing 20 units of bacitracin per milliliter was filtered through this bed. The filtrate was discarded and filter bed washed with 1 liter of water, ½ liter of 5% ferric chloride solution, and again with water until the filtrate was iron free. The washings were discarded. Two and one-half liters of a saturated calcium hydroxide solution was then put through the filter bed. The filtrate was collected, neutralized with oxalic acid to pH 5.5 producing a precipitate of calcium oxalate. The precipitate was removed by filtration and the filtrate concentrated in vacuo to 500 milliliters and then lyophilized. The lyophilized product consisted of 3 grams of bacitracin and represented 150,000 units. This represents a 75% yield of bacitracin of a potency of 50 units per milligram and a toxicity of only 25,000 units per kilogram in mice (LD 50).

*Example 2.*—Two liters of a fermentation broth was clarified by adjusting the pH to approximately 4 with 1:1 hydrochloric acid, treating with 10% ferric chloride solution until a coagulum formed and a pH of approximately 2.5 resulted and separating the coagulum. The clarified fermentation broth contained 13 u./ml. of bacitracin.

An adsorbent bed consisting of 2.5 grams USP 12 bentonite admixed with 20 gms. of flux calcined diatomaceous earth for a filter aid was put down on a Buchner funnel and washed successively with dilute ammonia until the washings were colorless, with 50–100 ml. distilled water, 100 ml. dilute hydrochloric acid, and then with distilled water until the washings were anion free.

One liter of the clarified fermentation broth containing 13 u./ml. of bacitracin was passed over the adsorbent bed. The filtrate contained no detectable bacitracin. The adsorbent bed was washed with 500 ml. distilled water and the bacitracin then eluted with 500 ml. water containing 20 ml. saturated barium hydroxide solution.

The eluate was neutralized with sulfuric acid to a pH of 7.5 and barium sulfate precipitated which was removed by filtration. The filtrate was concentrated in vacuo to 100 ml. and lyophilized.

The lyophilized product consisted of bacitracin of a potency of 21 u./mg. and the yield was 57%. The yield suffered due to absorption of bacitracin on the barium sulfate precipitated. Further, as the adsorbent was not washed after adsorption of the bacitracin, certain impurities were not removed and on elution accompanied the bacitracin and decreased the potency of the final product.

*Example 3.*—Example 2 as repeated using 20 grams of magnesium trisilicate as an adsorbent bed. Substantially similar results were obtained.

*Example 4.*—150 grams of infusorial earth (Johns-Manville Filter-Cel) was preconditioned by washing in succession with dilute ammonia until the washings were colorless then with approximately one liter of distilled water, approximately 1 liter of 1% hydrochloride acid and finally with distilled water until the washings were anion free. This adsorbent was stirred into 10 liters of clarified fermentation broth containing 20 units of bacitracin per milliliter (obtained as in Example 1) and stirring continued for approximately 10 minutes. The adsorbent was separated from the broth by filtration and was washed with one liter of water, ½ liter of 5% ferric chloride solution and again with water until the filtrate was iron free. The adsorbent was stirred into 2½ liters of a saturated calcium hydroxide solution and stirring continued for approximately 10 minutes. The adsorbent was then separated from the calcium hydroxide solution by filtration. The calcium hydroxide solution containing the bacitracin was collected and neutralized with oxalic acid to pH 5.5 which produced a precipitate of calcium oxalate. The precipitate was removed by filtration and the filtrate concentrated in vacuo to 500 milliliters and then lyophilized. The lyophilized product consisted of 3 grams of bacitracin and represented 150,000 units. This represents a 75% yield of bacitracin of a potency of 50 units per milligram and a toxicity of only 25,000 units per kilogram in mice (LD 50).

*Example 5.*—Example 1 was repeated using 150 grams of Dicalite Superaid as an adsorbent. Substantially similar results were obtained.

What is claimed is:

1. The method of purifying bacitracin consisting in admixing a clarified fermentation broth containing bacitracin with a zeolitic material chosen from the group consisting of unrefined diatomaceous earth, bentonite, kaolin, fuller's earth, and magnesium trisilicate, separating the zeolitic material and admixing it with a dilute hydroxide solution chosen from the class consisting of alkali metals and alkaline earth metals, separating the solution from the zeolitic material, and separating the bacitracin from the solution.

2. The method of purifying bacitracin consisting in admixing a clarified fermentation broth containing bacitracin with a zeolitic material, chosen from the group consisting of unrefined diatomaceous earth, bentonite, kaolin, fuller's earth and magnesium trisilicate, separating the zeolitic material from the fermentation broth, washing the zeolitic material successively with water, dilute ferric chloride solution, and water until the final washings are anion free, admixing the zeolitic material with an alkaline solution, separating the alkaline solution from the zeolitic material, removing the alkaline cations and separating the bacitracin from the solution.

3. The method of purifying bacitracin as claimed in claim 2 in which the zeolitic material used is bentonite admixed with a filter aid.

4. The method of purifying bacitracin consisting in admixing a clarified fermentation broth containing bacitracin with unrefined diatomaceous earth, separating the unrefined diatomaceous earth from the fermentation broth, successively washing the unrefined diatomaceous earth with water, dilute ferric chloride solution, and water until the final washings are anion free, admixing the unrefined diatomaceous earth with a dilute barium hydroxide solution, separating the barium hydroxide solution from the unrefined diatomaceous earth, treating the barium hydroxide solution with oxalic acid until no further barium oxalate is precipitated, removing the barium oxalate from the solution, concentrating the solution in vacuo, and separating the bacitracin from the concentrated solution by lyophilization.

JESSE CHARNEY.

REFERENCES CITED

The following references are of record in the file of this patent:

UNITED STATES PATENTS

| Number | Name | Date |
|---|---|---|
| 2,457,887 | Goorley | Jan. 4, 1949 |

OTHER REFERENCES

I. Goorley "Some Chemical and Physical Properties of Bacitracin" paper presented at Research in Antibiotics: A Symposium. Wash., D. C. Jan. 31–Feb. 1, 1947.

Anker—in J. Bacteriology, vol. 55, Feb. 1948 pp. 249–255.

II. Shepherd in J. Am. Chem. Soc. Nov. 1948 pp. 3771–3774.